(12) United States Patent  
Gaur

(10) Patent No.: US 7,920,497 B2
(45) Date of Patent: Apr. 5, 2011

(54) SYSTEM AND METHOD FOR MULTICAST/BROADCAST RELIABILITY ENHANCEMENT OVER WIRELESS LANS

(75) Inventor: Sudhanshu Gaur, Campbell, CA (US)

(73) Assignee: Hitachi, Ltd., Tokyo (JP)

( * ) Notice: Subject to any disclaimer, the term of this patent is extended or adjusted under 35 U.S.C. 154(b) by 862 days.

(21) Appl. No.: 11/839,501

(22) Filed: Aug. 15, 2007

(65) Prior Publication Data

US 2009/0046613 A1 Feb. 19, 2009

(51) Int. Cl.
*H04B 7/00* (2006.01)

(52) U.S. Cl. ................. 370/310.2; 370/328

(58) Field of Classification Search .......... 370/400, 370/310.1, 328, 332, 349, 445, 462, 461
See application file for complete search history.

(56) References Cited

U.S. PATENT DOCUMENTS

| 5,905,871 A | 5/1999 | Buskens et al. |
| 6,990,098 B1 * | 1/2006 | Eberle et al. ............ 370/390 |
| 7,013,157 B1 | 3/2006 | Norman et al. |
| 7,451,221 B2 * | 11/2008 | Basani et al. ............ 709/226 |
| 2004/0196917 A1 | 10/2004 | Toshimitsu |
| 2006/0256740 A1 | 11/2006 | Koski |
| 2006/0285518 A1 | 12/2006 | Lin et al. |

OTHER PUBLICATIONS

IEEE 802.11 WG, Draft Supplement to Part 11: Wireless Medium Access Control (MAC) and Physical Layer (PHY) Specifications: Medium Access Control (MAC) Enhancements for Qualit.
J. Kuri and S.K. Kasera, "Reliable Multicast in Multi-access Wireless LANs", ACM Wireless Networks, 2001.

* cited by examiner

*Primary Examiner* — Brenda Pham
(74) *Attorney, Agent, or Firm* — Mattingly & Malur, P.C.

(57) ABSTRACT

A system comprises a communication engine for transmitting at least one groupcast packet to wireless stations on a wireless network; an ACK leader selection engine for identifying at least one of the wireless stations as a current ACK leader responsible for generating any ACK in response to the at least one groupcast packet, and for shifting the current ACK leader among a group of the wireless stations; and an ACK management engine for managing any ACK received from the current ACK leader.

20 Claims, 11 Drawing Sheets

(a) ACK SENT BY ALL THE CLIENTS IN ROUND ROBIN MANNER (b) ACK SENT BY A SUBSET OF CLIENTS IN ROUND ROBIN MANNER

IEEE 802.11 MECHANISM FOR MULTICAST: NO ACK SENT BY CLIENTS

LEADER BASED MULTICAST: ACK SENT BY THE LEADER CLIENT (a) ACK SENT BY ALL THE CLIENTS IN ROUND ROBIN MANNER (b) ACK SENT BY A SUBSET OF CLIENTS IN ROUND ROBIN MANNER

Flowchart for the AP functionality is shown for the multicast/broadcast protocol for multimedia delivery Flowchart for the client STA functionality is shown for the multicast/broadcast protocol for multimedia delivery Flowchart depicting the flow of control on AP side for group ACK based multicast Flowchart depicting the flow of control on client side for group ACK based multicast

SYSTEM AND METHOD FOR MULTICAST/BROADCAST RELIABILITY ENHANCEMENT OVER WIRELESS LANS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates generally to wireless local area networks (WLANs), and more particularly provides a system and method for multicast/broadcast reliability enhancement in WLANs.

BACKGROUND

As users experience the convenience of wireless connectivity, they are demanding increasing support. Typical applications over wireless networks include video streaming, video conferencing, distance learning, etc. Because wireless bandwidth availability is restricted, quality of service (QoS) management is increasingly important in 802.11 networks.

The original 802.11 media access control (MAC) protocol was designed with two modes of communication for wireless stations (STAs). The first mode, Distributed Coordination Function (DCF), is based on Carrier Sense Multiple Access with Collision Avoidance (CSMA/CA), sometimes referred to as "listen before talk." A wireless station (STA) waits for a quiet period on the network and then begins to transmit data and detect collisions. The second mode, Point Coordination Function (PCF), supports time-sensitive traffic flows. Using PCF, wireless access points (APs) periodically send beacon frames to communicate network identification and management parameters specific to the wireless local area network (WLAN). Between beacon frames, PCF splits time into a contention period (CP) where the STAs implement a DCF protocol, and a contention-free period (CFP) where an AP coordinates access by the various STAs based on QoS requirements.

Because DCF and PCF do not differentiate between traffic types or sources, IEEE proposed enhancements to both coordination modes to facilitate QoS. These changes are intended to fulfill critical service requirements while maintaining backward-compatibility with current 802.11 standards.

Enhanced Distributed Channel Access (EDCA) introduces the concept of traffic categories (or access classes). Using EDCA, STAs try to send data after detecting that the wireless medium is idle for a set time period defined by the corresponding access class (AC). A higher-priority AC will have a shorter wait time than a lower-priority AC. While no guarantees of service are provided, EDCA establishes a probabilistic priority mechanism to allocate bandwidth based on ACs.

The IEEE 802.11e EDCA standard provides QoS differentiation by grouping traffic into four ACs, i.e., voice, video, best effort and background. Each transmission frame from the upper layers bears a priority value (0-7), which is passed down to the MAC layer. Based on the priority value, the transmission frames are mapped into the four ACs at the MAC layer. The voice (VO) AC has the highest priority; the video (VI) AC has the second highest priority; the best effort (BE) AC has the third highest priority; and the background (BK) AC has the lowest priority. Each AC has its own transmission queue and its own set of AC-sensitive medium access parameters. Traffic prioritization uses the medium access parameters—the arbitration interframe space (AIFS) interval, contention window (CW, CWmin and CWmax), and transmission opportunity (TXOP)—to ensure that a higher priority AC has relatively more medium access opportunity than a lower priority AC.

Generally, in EDCA, AIFS is the time interval that a STA must sense the wireless medium to be idle before invoking a backoff mechanism or transmission. A higher priority AC uses a smaller AIFS interval. The contention window (CW, CWmin and CWmax) indicates the number of backoff time slots until the STA can attempt another transmission. The contention window is selected as a random backoff number of slots between 0 and CW. CW starts at CWmin. CW is essentially doubled every time a transmission fails until CW reaches its maximum value CWmax. Then, CW maintains this maximum value CWmax until the transmission exceeds a retry limit. A higher priority AC uses smaller CWmin and CWmax. A lower priority AC uses larger CWmin and CWmax. The TXOP indicates the maximum duration that an AC can be allowed to transmit frames after acquiring access to the medium. To save contention overhead, multiple transmission frames can be transmitted within one TXOP without additional contention, as long as the total transmission time does not exceed the TXOP duration.

To reduce the probability of two STAs colliding, because the two STAs cannot hear each other, the standard defines a virtual carrier sense mechanism. Before a STA initiates a transaction, the STA first transmits a short control frame called RTS (Request To Send), which includes the source address, the destination address and the duration of the upcoming transaction (i.e. the data frame and the respective ACK). Then, the destination STA responds (if the medium is free) with a responsive control frame called CTS (Clear to Send), which includes the same duration information. All STAs receiving either the RTS and/or the CTS set a virtual carrier sense indicator, i.e., the network allocation vector (NAV), for the given duration, and use the NAV together with the physical carrier sense when sensing the medium as idle or busy. This mechanism reduces the probability of a collision in the receiver area by a STA that is "hidden" from the transmitter STA to the short duration of the RTS transmission, because the STA hears the CTS and "reserves" the medium as busy until the end of the transaction. The duration information in the RTS also protects the transmitter area from collisions during the ACK from STAs that are out of range of the acknowledging STA. Due to the fact that the RTS and CTS are short, the mechanism reduces the overhead of collisions, since these transmission frames are recognized more quickly than if the whole data transmission frame was to be transmitted (assuming the data frame is bigger than RTS). The standard allows for short data transmission Frames, i.e., those shorter than an RTS Threshold, to be transmitted without the RTS/CTS transaction.

With these medium access parameters, EDCA generally works in the following manner:

Before a transmitting STA can initiate any transmission, the transmitting STA must first sense the channel idle (physically and virtually) for at least an AIFS time interval. If the channel is idle after the initial AIFS interval, then the transmitting STA initiates an RTS transmission and awaits a CTS transmission from the receiving STA.

If a collision occurs during the RTS transmission or if CTS is not received, then the transmitting STA invokes a backoff procedure using a backoff counter to count down a random number of backoff time slots selected between 0 and CW (initially set to CWmin). The transmitting STA decrements the backoff counter by one as long as the channel is sensed to be idle. If the transmitting STA senses the channel to be busy at any time during the backoff procedure, the transmitting STA suspends its current backoff procedure and freezes its backoff counter until the channel is sensed to be idle for an AIFS interval again. Then, if the channel is still idle, the transmitting STA resumes decrementing its remaining backoff counter.

Once the backoff counter reaches zero, the transmitting STA initiates an RTS transmission and awaits a CTS transmission from the receiving STA. If a collision occurs during the RTS transmission or CTS is not received, then the transmitting STA invokes another backoff procedure, possibly increasing the size of CW. That is, as stated above, after each unsuccessful transmission, CW is essentially doubled until it reaches CWmax. After a successful transmission, CW returns to its default value of CWmin. During the transaction, the STA can initiate multiple frame transmissions without additional contention as long as the total transmission time does not exceed the TXOP duration.

The level of QoS control for each AC is determined by the combination of the medium access parameters and the number of competing STAs in the network.

The Hybrid Coordination Function (HCF) is another 802.11e wireless protocol. Generally, HCF uses the concepts of PCF, but substitutes the protocols of DCF during the contention period (CP) with the improved protocols of EDCA. Using HCF, a hybrid coordinator (HC), typically co-located with the AP, periodically sends beacon frames. Each beacon frame includes a beacon interval, a timestamp, a service set identifier (SSID) identifying the specific wireless LAN, supported rates, parameter sets identifying implemented signaling protocols (frequency hopping spread spectrum, direct sequence spread spectrum, etc.), capability information identifying communication requirements (WEP, etc.), a traffic indication map (TIM) identifying data frames waiting in the AP's buffer, and a contention-free period (CFP) duration. The AP and STAs use the information in the beacon frames to implement HCF.

Between beacon frames, HCF splits time into a contention-free period (CFP) and a contention period (CP). During the CFP, the AP uses HCF controlled channel access (HCCA) protocols to coordinate access by the various STAs based on QoS requirements. The contention-free period (CFP) typically begins with the receipt of a beacon frame, and ends either upon expiration of the CFP duration as specified in the beacon frame or upon receiving a CFP-End frame from the HC. During the CP, the AP and STAs use a combination of EDCA and HCCA protocols. Each STA accesses the wireless medium when the wireless medium is determined to be available under EDCA rules or when the STA receives a QoS CF-Poll frame from the HC. In other words, unlike PCF, HCF enables contention-free bursts called controlled access periods (CAPs) during the CP to allow priority traffic to access the wireless medium without contention. At all other times during the CP, the STAs access the wireless medium using EDCA. FIG. 1B is a timing diagram illustrating prior art CAP/CP/CFP intervals. As shown, a CFP Repetition Interval includes both the CFP and CP.

It should be noted that the IEEE 802.11e standard only supports enhanced QoS for unicast traffic, and does not address QoS support for multicast/broadcast traffic. Unicast traffic generally refers to communication of a piece of information from one point to another point. In the unicast case, there is one sender and one receiver. Broadcast traffic generally refers to communication of a piece of information from one point to all other points on the network. In the broadcast case, there is one sender, and all points connected to the medium are the receivers. Multicast traffic generally refers to communication of a piece of information from one or more points on a network to a group of other points on the network. In the multicast case, there may be one or more senders, and a group of zero or more points are the receivers.

FIG. 1 is a block diagram illustrating a prior art multicast/broadcast network 100. The AP 105 sends a multicast/broadcast packet 110 to STA1, STA2, STA3 and STA4. In accordance with the prior art, receiving STA1, STA2, STA3 and STA4 do not return an ACK frame to confirm receipt of an error-free packet. Accordingly, there is little to no transport reliability.

FIG. 2 is a block diagram illustrating a prior art multicast/broadcast network 200. The AP 205 sends a multicast/broadcast packet 210 to STA1, STA2, STA3 and STA4. As shown, STA3 is the leader, returning an ACK frame on behalf of all STAs to confirm receipt of an error-free packet. However, this scheme does not ensure good reception by the other multicast/broadcast clients.

The QoS provisions for multicast/broadcast traffic in prior art systems are insufficient. Systems and methods that enhance QoS in the multicast/broadcast environment are needed.

Example prior art references include the following:
1. IEEE 802.11 WG, "Draft Supplement to Part 11: Wireless Medium Access Control (MAC) and Physical Layer (PHY) Specifications: Medium Access Control (MAC) Enhancements for Quality of Service (QoS)", *IEEE 802.11e*, November. 2005.
2. J. Kuri and S. K. Kasera, "Reliable Multicast/Broadcast in Multi-access Wireless LANS," *ACM Wireless Networks*, 2001.
3. U.S. Pat. No. 5,905,871
4. U.S. Pat. No. 7,013,157
5. U.S. Patent Publication No. 2004/0196917
6. U.S. Patent Publication No. 2006/0256740
7. U.S. Patent Publication No. 2006/0285518

SUMMARY

Embodiments of the invention make multicast/broadcast delivery of multimedia content over WLAN more reliable. For convenience, the term "groupcast" (as in "groupcast packet") is hereafter intended to include multicast (as in "multicast packet"), broadcast (as in "broadcast packet"), and any other non-unicast trans mission. Example embodiments implement one or more of the following:
(i) Sending an ACK to a groupcast packet by one or more client stations of a group of client stations, e.g., in a round-robin fashion ("shifting ACK leaders" or "distributed ACK");
(ii) Sending a block-ACK to a block of groupcast packets by one or more client stations ("shifting block-ACK leaders" or "distributed block-ACK"); and/or
(iii) Selectively replicating packets, e.g., in a semi-probabilistic manner ("selective packet replication").

Per one embodiment, the present invention provides a system comprising a communication engine for transmitting at least one groupcast packet to wireless stations on a wireless network; an ACK leader selection engine for identifying at least one of the wireless stations as a current ACK leader responsible for generating any ACK in response to the at least one groupcast packet, and for shifting the current ACK leader among a group of the wireless stations; and an ACK management engine for managing any ACK received from the current ACK leader.

The ACK leader selection engine may identify possible ACK leaders from the wireless stations based on packet error rate metrics, or based on signal strength metrics. The ACK management engine may instruct the communication engine to retransmit the at least one groupcast packet if no ACK is received from the ACK leader. The communication engine may include an identifier in the at least one groupcast packet that identifies the current ACK leader. The communication engine may include an ACK-active/ACK-inactive bit that identifies whether the current ACK leader is requested to respond with an ACK. The at least one groupcast packet may include a plurality of groupcast packets, and the ACK may include a block-ACK. The ACK management engine may instruct the communication engine to retransmit at least the groupcast packets identified in the block-ACK as having an error. The group of wireless stations may include a subset of the wireless stations on the wireless network.

Per another embodiment, the present invention may provide a method comprising identifying at least one wireless station of a first group of wireless stations on a wireless network as a current ACK leader; transmitting at least one groupcast packet to a second group of wireless stations on the wireless network; managing any ACK received from the current ACK leader; and identifying a new ACK leader within the first group of the wireless stations.

The method may further comprise identifying possible ACK leaders based on packet error rate metrics or based on signal strength metrics. The method may further comprise retransmitting the at least one groupcast packet if no ACK is received from the ACK leader. The method may further comprise including an identifier in the at least one groupcast packet that identifies the current ACK leader. The method may further comprise including an ACK-active/ACK-inactive bit that identifies whether the current ACK leader is requested to respond with an ACK. The at least one groupcast packet may include a plurality of groupcast packets, and the ACK includes a block-ACK. The method may further comprise retransmitting at least the groupcast packets identified in the block-ACK as having an error. The first group of wireless stations may include a subset of the second group of wireless stations. The first group of wireless stations may be the same as the second group of wireless stations.

Per yet another embodiment, the present invention may provide a method comprising receiving at least one groupcast packet from an access point; determining whether the at least one groupcast packet identifies the wireless station as a current ACK leader; and generating any ACK to the access point in response to the at least one groupcast packet received, if the at least one groupcast packet identifies the wireless station as the current ACK leader.

DETAILED DESCRIPTION

The following description is provided to enable any person skilled in the art to make and use the invention and is provided in the context of a particular application. Various modifications to the embodiments are possible, and the generic principles defined herein may be applied to these and other embodiments and applications without departing from the spirit and scope of the invention. Thus, the invention is not intended to be limited to the embodiments and applications shown, but is to be accorded the widest scope consistent with the principles, features and teachings disclosed herein.

Embodiments of the invention make multicast/broadcast delivery of multimedia content over WLAN more reliable. For convenience, the term "groupcast" (as in "groupcast packet") is hereafter intended to include multicast (as in "multicast packet"), broadcast (as in "broadcast packet"), and any other non-unicast transmission. Example embodiments implement one or more of the following:

(iv) Sending an ACK to a groupcast packet by one or more client stations of a group of client stations, e.g., in a round-robin fashion ("shifting ACK leaders" or "distributed ACK");

(v) Sending a block-ACK to a block of groupcast packets by one or more client stations ("shifting block-ACK leaders" or "distributed block-ACK"); and/or (vi) Selectively replicating packets, e.g., in a semi-probabilistic manner ("selective packet replication").

Figure 1:
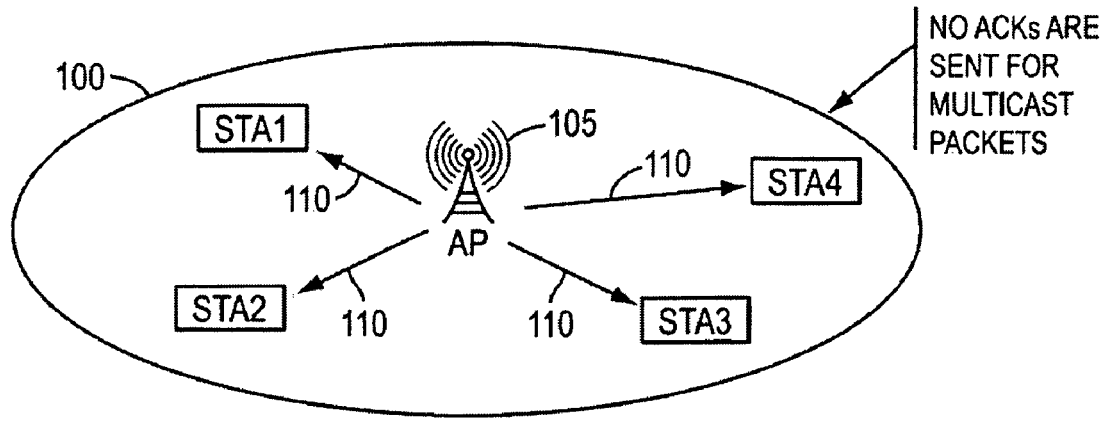
FIG. 1 is a block diagram illustrating a prior art multicast/broadcast network.
Figure 2:
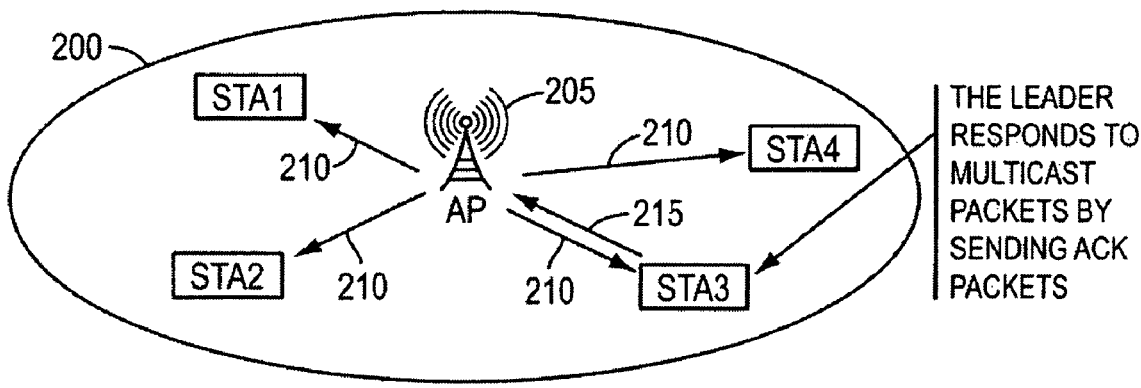
FIG. 2 is a block diagram illustrating a second prior art multicast/broadcast network.
Figure 3:
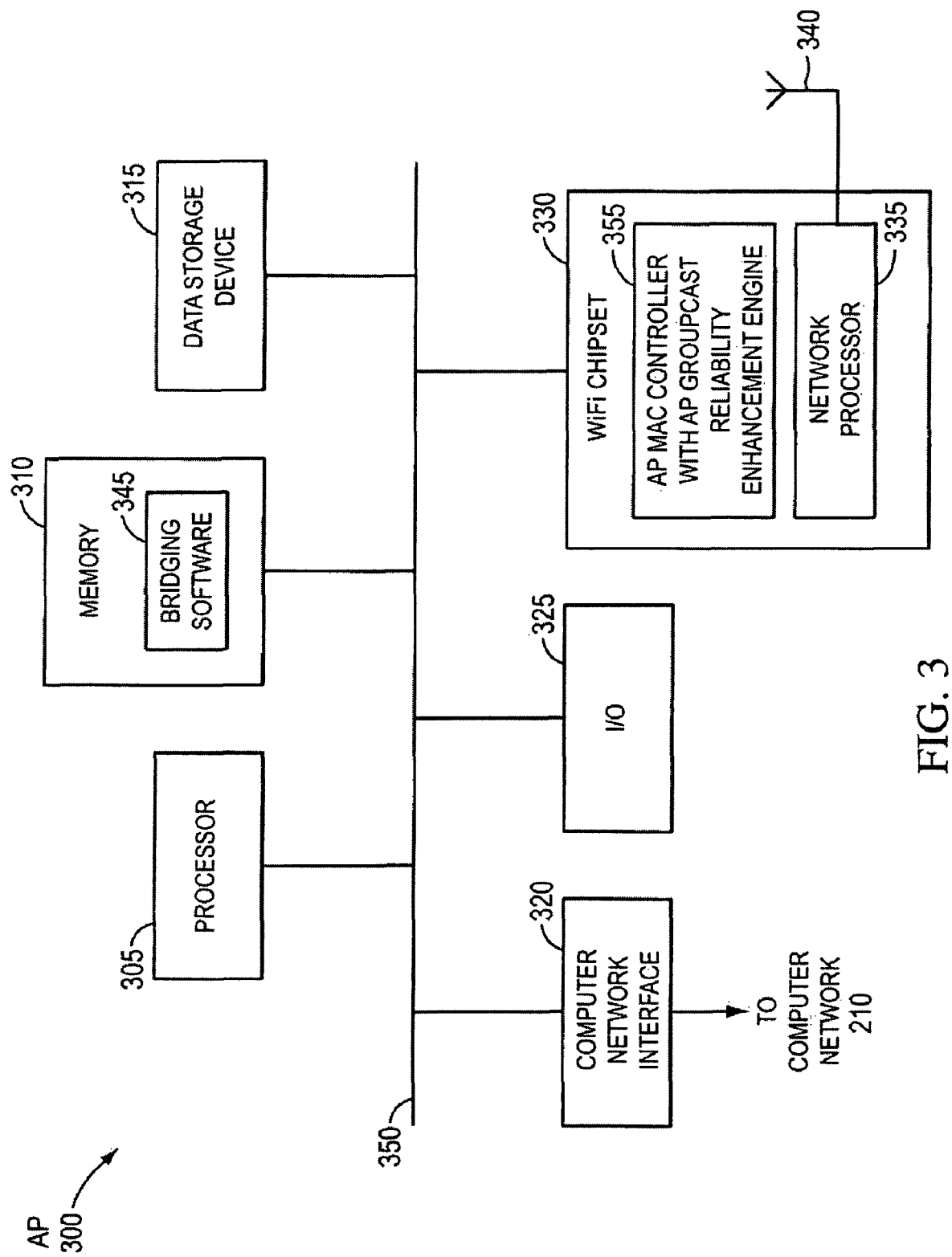
FIG. 3 is a block diagram illustrating an access point, in accordance with an embodiment of the present invention.

FIG. 3 is a block diagram illustrating an access point 300, in accordance with an embodiment of the present invention. The AP 300 includes a processor 305 (such as an Intel Pentium® microprocessor or a Motorola Power PC® microprocessor), memory 310 (such as random-access memory), a data storage device 315 (such as a magnetic disk), a computer network interface 320, input/output (I/O) 325 (such as a keyboard, mouse and LCD display), and a WiFi chipset 330, each coupled to the communication channel 350. The computer network interface 320 may be coupled to a computer network, e.g., the Internet. One skilled in the art will recognize that, although the memory 310 and the data storage device 315 are illustrated as different units, the memory 310 and the data storage device 315 can be parts of the same unit, distributed units, virtual memory, etc. The term "memory" herein is intended to cover all data storage media whether permanent or temporary.

The memory 310 stores bridging software 345 that enables communications between the WiFi chipset 330 and the computer network interface 320. The WiFi chipset 330 contains an AP MAC controller (with an AP groupcast reliability enhancement engine) 355 and a network processor 335 coupled to a wireless antenna 340. Details of the AP MAC controller 355 are described below with reference to FIG. 4.

Figure 4:
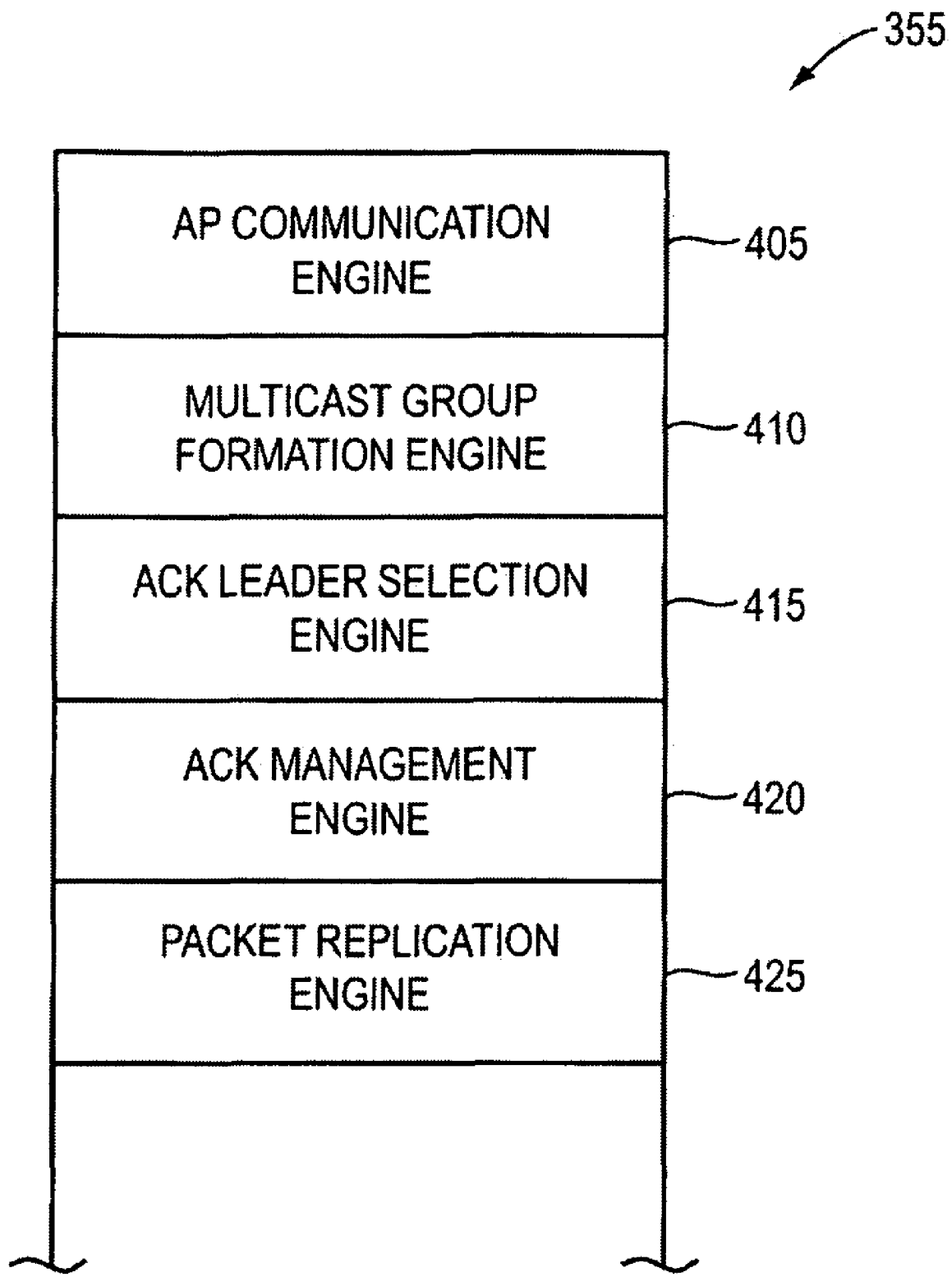
FIG. 4 is a block diagram illustrating the AP MAC controller with an AP multicast/broadcast reliability enhancement engine, in accordance with an embodiment of the present invention.

FIG. 4 is a block diagram illustrating the AP MAC controller (with an AP groupcast reliability enhancement engine) 355, in accordance with an embodiment of the present invention. The AP MAC controller 355 includes STA communication engine 405, a multicast group formation engine 410, an ACK leader selection engine 415, an ACK management engine 420, and a packet replication engine 425.

The AP communication engine 405 includes hardware, software and/or firmware for effecting point-coordinated and/or distributed coordinated access to the wireless medium, possibly using an IEEE 802.11e framework. The AP communication engine 405 also includes hardware, software and/or firmware for associating STAs into its service set. Information exchanged during the association process may include assigning STA IDs to each of the STAs. In one embodiment, the maximum number of STAs allowed in the service set operated by the AP 300 may dictate the number of bits in each STA ID. For example, if only sixteen STAs are allowed in the service set, then the STA ID may be four bits.

The multicast group formation engine 410 includes hardware, software and/or firmware for generating one or more multicast groups, e.g., for determining which STAs of the STAs in the service set are part of a multicast group. Formation of a multicast group may be effected using a process such as user selection.

The ACK leader selection engine 415 includes hardware, software and/or firmware for selecting STAs, e.g., from all STAs (the broadcast group) or from within the STAs of a multicast group, to be designated as possible ACK leaders for that groupcast group. Selection of possible ACK leaders may be based on packet error rate, signal strength, other transmission-based metrics, or other metrics. In one embodiment, the STAs of a groupcast group with a PER greater than a PER threshold, e.g., 5%, and/or with a signal strength lower than a signal strength threshold, may be designated as possible ACK leaders for that groupcast group. In another embodiment, the top X (e.g., five) STAs with the greatest PER or lowest signal strength of a groupcast group may be designated as the possible ACK leaders of that groupcast group. Different groupcast groups may have different possible ACK leaders. And, a STA may be designated as a possible ACK leader for one or more groupcasts groups, e.g., for different multicast groups, for the broadcast group and one or more multicast groups, etc.

Further, the ACK leader selection engine 415 includes hardware, software and/or firmware for selecting one of the possible ACK leaders to act as the current ACK leader for a particular packet or block of packets being transmitted to a groupcast group. The ACK leader selection engine 415 sends the STA ID to the AP communication engine 405, which incorporates the STA ID into the packet header before transmitting the groupcast packet to the groupcast group. As described below, the STA having the STA ID recognizes that it is the current ACK leader responsible for acknowledging the groupcast packet received, and for responding with the appropriate ACK (e.g., ACK, block ACK, no response, etc.).

The ACK management AP engine 420 includes hardware, software and/or firmware for managing ACKs received or not received from the current ACK leader(s). In one embodiment, the ACK management AP engine 420 may be part of the AP communication module 405. The ACK management AP engine 420 waits for an anticipated ACK, multiple ACKs, block ACK, etc. If received, then the ACK management AP engine 420 instructs the AP communication engine 405 to continue with the next groupcast packet. If not received, then the ACK management AP engine 420 instructs the AP communication engine 405 to send the prior groupcast packet or packets again. This process may repeat for a maximum number of repetitions, e.g., two or three. Alternatively, after a prescribed number of repetitions, the ACK management AP engine 420 may request the ACK leader selection engine 415 to designate a different current ACK leader, recognizing that the previously designated ACK leader may have moved outside the coverage area, may be encountering technical difficulties, etc.

The ACK management engine 420 may be capable of block-ACK management. That is, the AP communication engine 405 may be configured to send a predetermined number, e.g., eight, groupcast packets. Then, as described below, the current ACK leader responds with a block-ACK, e.g., a set of ACKs, identifying the groupcast packets received without error and the groupcast packets received with errors. In one embodiment, the block-ACK includes a bitmap. The ACK management engine 420 in response instructs the AP communication engine 405 to transmit the groupcast packets with errors or the entire set of groupcast packets to the groupcast group again. In one embodiment, the STAs maintain the groupcast packets without errors and replace the groupcast packets with errors with the new groupcast packets before sending an updated block-ACK. This process may repeat for a maximum number of repetitions, e.g., two or three, or until a block-ACK identifying no errors remaining is received.

In another embodiment, the AP 300 may be configured to receive a block-ACK from each of the STAs in the groupcast group. Thus, AP communication engine 405 may send STA ID information to designate each STA in a round-robin manner as the current ACK leader. The ACK management engine 420 in response instructs the AP communication engine 405 to transmit the packets with errors or the entire set of packets to the groupcast group again. In one embodiment, the STAs maintain the groupcast packets without errors and replace the groupcast packets with errors with the new groupcast packets before sending an updated block-ACK. In another embodiment, the ACK management engine 420 may instruct the AP communication engine 405 to send via unicast transmission the missing groupcast packets to the individual STAs. This process may repeat for a maximum number of repetitions, e.g., two or three, or until a block-ACK identifying no errors remaining is received.

The packet replication engine 425 includes hardware, software and/or firmware to enable selective replication of packets, e.g., based on a probabilistic or semi-probabilistic scheme. For example, the packet replication engine 425 may select a random number between 0 and 1. For 20% packet repetition, if the random number is lower than 0.2, then the packet is repeated. The packet replication engine 425 may repeat this process after sending each packet to determine whether it should be repeated. Using selective replication, no ACK is needed. Further, the packet replication engine 425 may be configured to repeat a packet a maximum number of times, e.g., twice. Additional information on the packet replication engine 425 is described below with reference to FIGS. 12 and 13.

Figure 5:
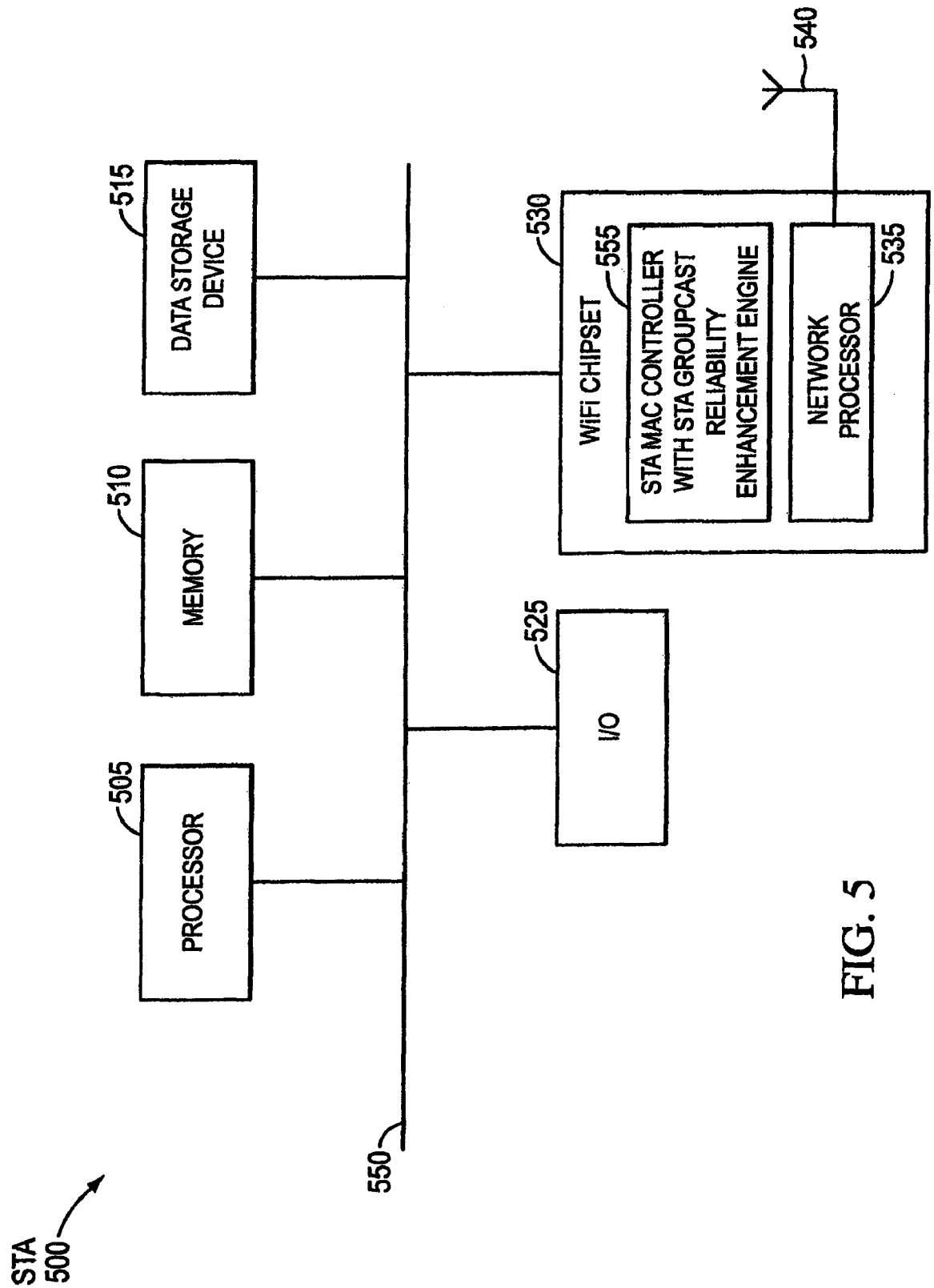
FIG. 5 is a block diagram illustrating a STA, in accordance with an embodiment of the present invention.

FIG. 5 is a block diagram illustrating a STA 500, in accordance with an embodiment of the present invention. The STA 500 includes a processor 505 (such as an Intel Pentium® microprocessor or a Motorola Power PC® microprocessor), memory 510 (such as random-access memory), a data storage device 515 (such as a magnetic disk), input/output (I/O) 525 (such as a keyboard, mouse and LCD display), and a WiFi chipset 530, each coupled to the communication channel 550. One skilled in the art will recognize that, although the memory 510 and the data storage device 515 are illustrated as different units, the memory 510 and the data storage device 515 can be parts of the same unit, distributed units, virtual memory, etc. The term "memory" herein is intended to cover all data storage media whether permanent or temporary.

The WiFi chipset 530 contains the STA MAC controller (with a STA groupcast reliability enhancement engine) 555 and a network processor 535 coupled to a wireless antenna 540. Details of the STA MAC controller 555 are described below with reference to FIG. 6.

Figure 6:
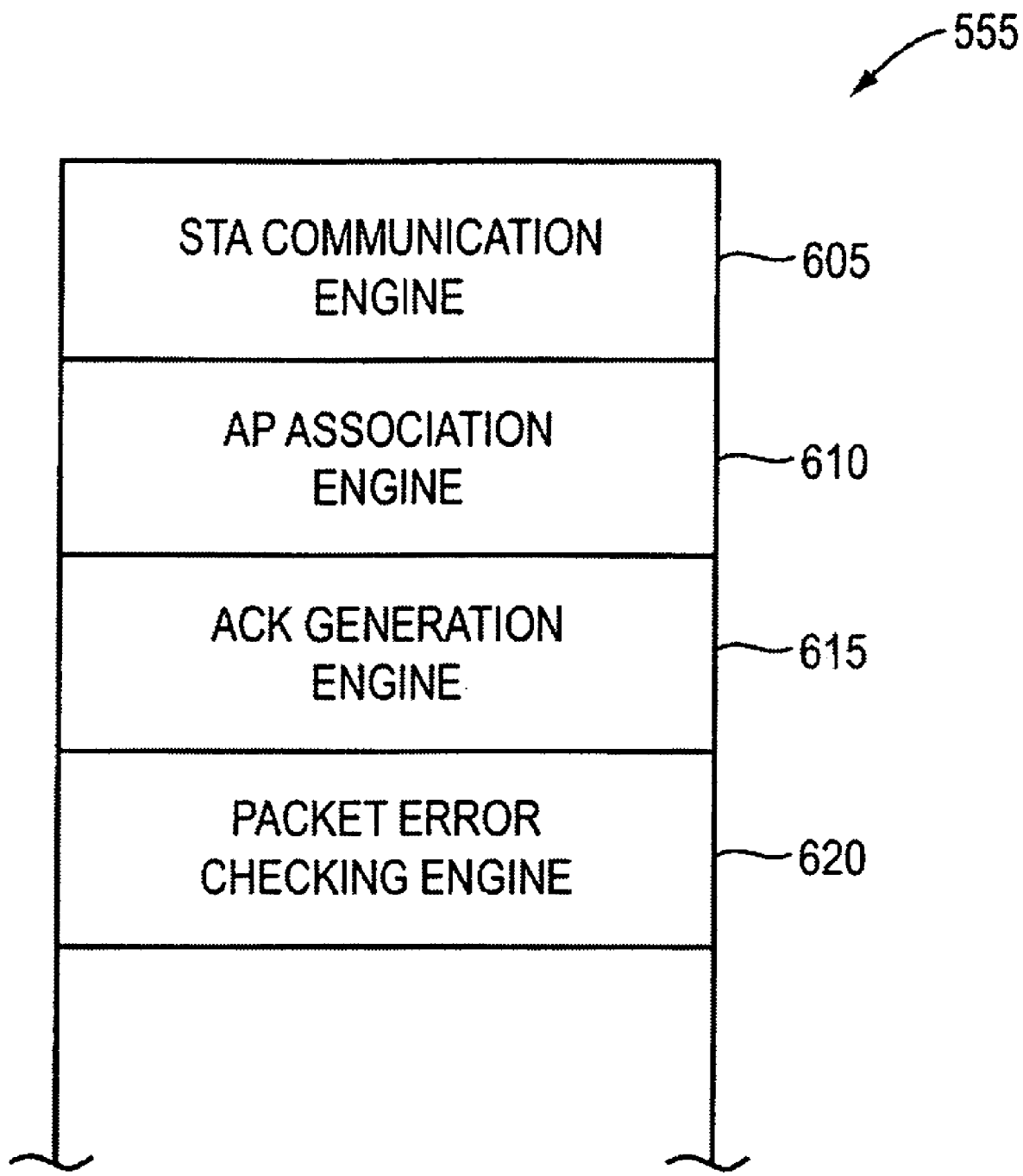
FIG. 6 is a block diagram illustrating the STA MAC controller with a STA multicast/broadcast reliability enhancement engine, in accordance with an embodiment of die present invention.

FIG. 6 is a block diagram illustrating the STA MAC controller (with a STA groupcast reliability enhancement engine) 555, in accordance with an embodiment of the present invention. The STA MAC controller 555 includes a STA communication engine 605, an AP association engine 610, an ACK generation engine 615, and a packet error checking engine 620.

The STA communication engine 605 includes hardware, software and/or firmware for effecting point-coordinated and/or distributed coordinated access to the wireless medium, possibly using an IEEE 802.11e framework.

The AP association engine 610 includes hardware, software and/or firmware for associating into the service set operated by the AP 300. In one embodiment, the AP association engine 610 may be part of the STA communication engine 605. Information exchanged during the association process may include receiving a STA ID from the AP 300. The AP association engine 610 may include forwarding PER and/or signal strength information to the AP 300, during an initialization stage, intermittently, upon request, etc.

The ACK generation engine 615 includes hardware, software and/or firmware for generating ACKs, block-ACKs, etc., possibly in response to the packet error checking engine 620 described below and possibly in response to a STA ID in the packet(s). For example, in an embodiment that incorporates an ACK leader model, the ACK leader(s) determines if there is an error (pursuant to the packet error checking engine 620 below), and responds with an appropriate ACK. An ACK may be a conventional ACK, as typically provided in response to a unicast packet. In an embodiment that incorporates a block-ACK model, each STA in the groupcast group or the ACK leader(s) if an ACK leader model is implemented responds with an appropriate block-ACK. The block-ACK may include a set of ACKs in response to a prescribed number of received packets.

The packet error checking engine 620 includes hardware, software and/or firmware for determining whether a received groupcast packet includes any errors. One example mechanism for determining packet errors includes conventional cyclic redundancy checks (CRC). In an embodiment that incorporates an ACK leader model, the packet error checking engine 620 may be configured to perform error checking in response to an instruction from the ACK generation engine 615, when the ACK generation engine 615 determines that the STA is designated as the current ACK leader. In an embodiment that implements a block-ACK model, the packet error checking engine 620 may perform error checking as the groupcast packets arrive or only after the entire block of groupcast packets have arrived.

Figure 7:
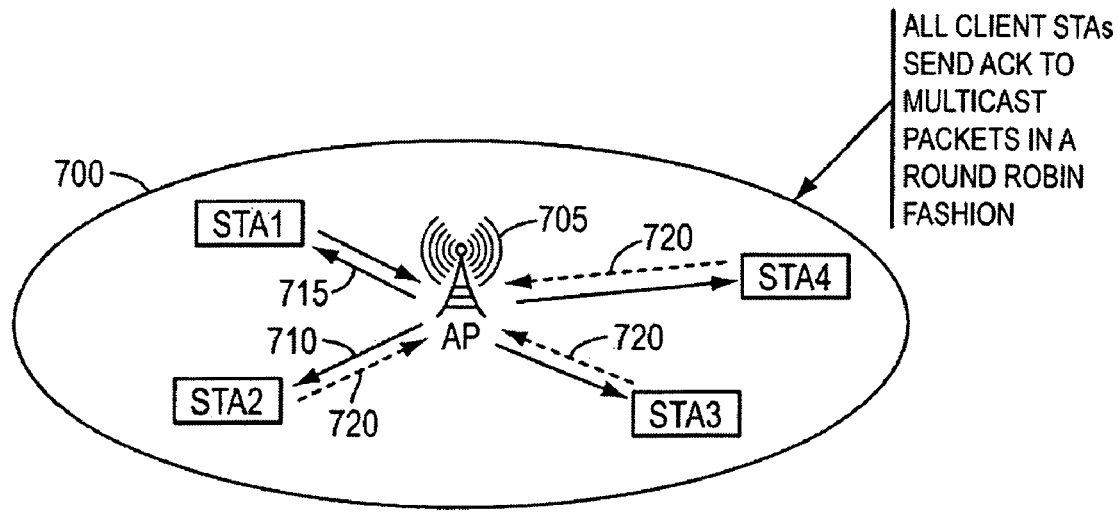
FIG. 7(a) is a block diagram illustrating a multicast/broadcast network implementing a round-robin multicast/broadcast reliability enhancement protocol, in accordance with an embodiment of die present invention.
FIG. 7(b) is a block diagram illustrating a multicast/broadcast network implementing a round-robin multicast/broadcast reliability enhancement protocol, in accordance with another embodiment of die present invention.
Figure 7:
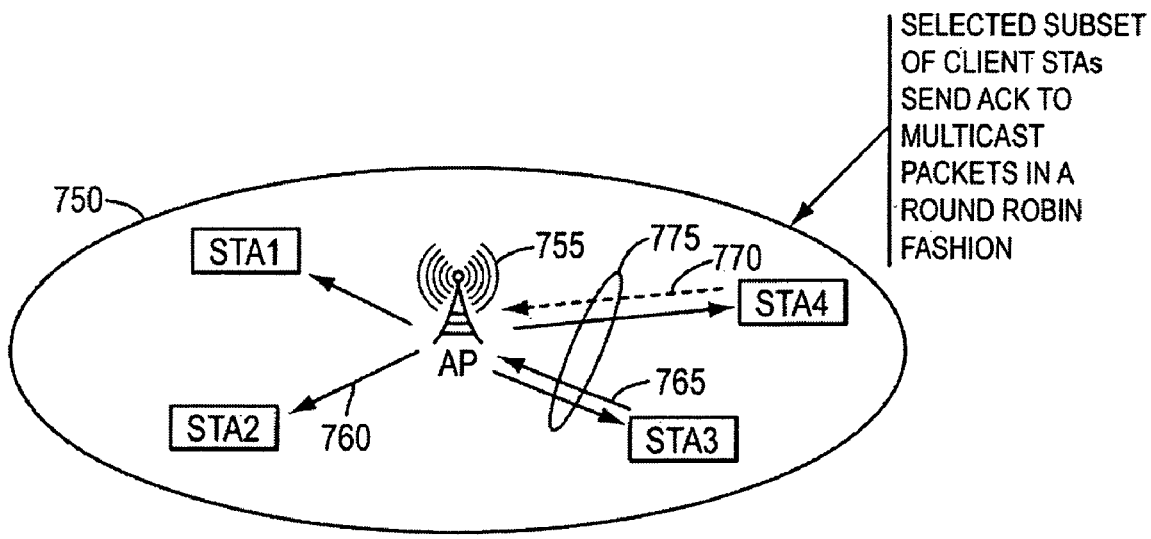

FIG. 7(*a*) is a block diagram illustrating a groupcast network 700 implementing round-robin ACK leader shifting, in accordance with an embodiment of the present invention. The network 700 includes an AP 705 coupled to four STAs, namely, STA1, STA2, STA3 and STA4. As represented by the solid outbound arrows, the AP 705 sends a groupcast packet 710 to each of the STAs. As represented by the inbound solid arrow, as the current ACK leader, STA1 provides the ACK 715 in response to the groupcast packet. As represented by the dashed inbound arrows, each of STA2, STA3 and STA4 take turns as the current ACK leader to provide ACKs 720, respectively. In one embodiment, the current ACK leader is designated in a round robin manner. Other ACK leader selection processes are also possible, such as using a probabilistic manner, based on PER or signal strength, etc.

FIG. 7(*b*) is a block diagram illustrating a groupcast network 750 implementing round-robin ACK leader shifting, in accordance with another embodiment of the present invention. The network 750 includes an AP 755 coupled to four STAs, namely, STA1, STA2, STA3 and STA4. As represented by the solid outbound arrows, the AP 755 sends a groupcast packet 760 to each of the STAs. As represented by the circle, STA3 and STA4 are possible ACK leaders 775. As represented by the solid inbound arrow, as the current ACK leader, STA3 provides the ACK 765 in response to the groupcast packet. As represented by the dashed inbound arrow, STA4 will be designated in the future as an ACK leader to provide ACK 770. In one embodiment, the ACK leader is designated in a round robin manner. Other ACK leader selection processes are also possible, such as using a probabilistic manner, based on PER or signal strength, etc.

Figure 8:
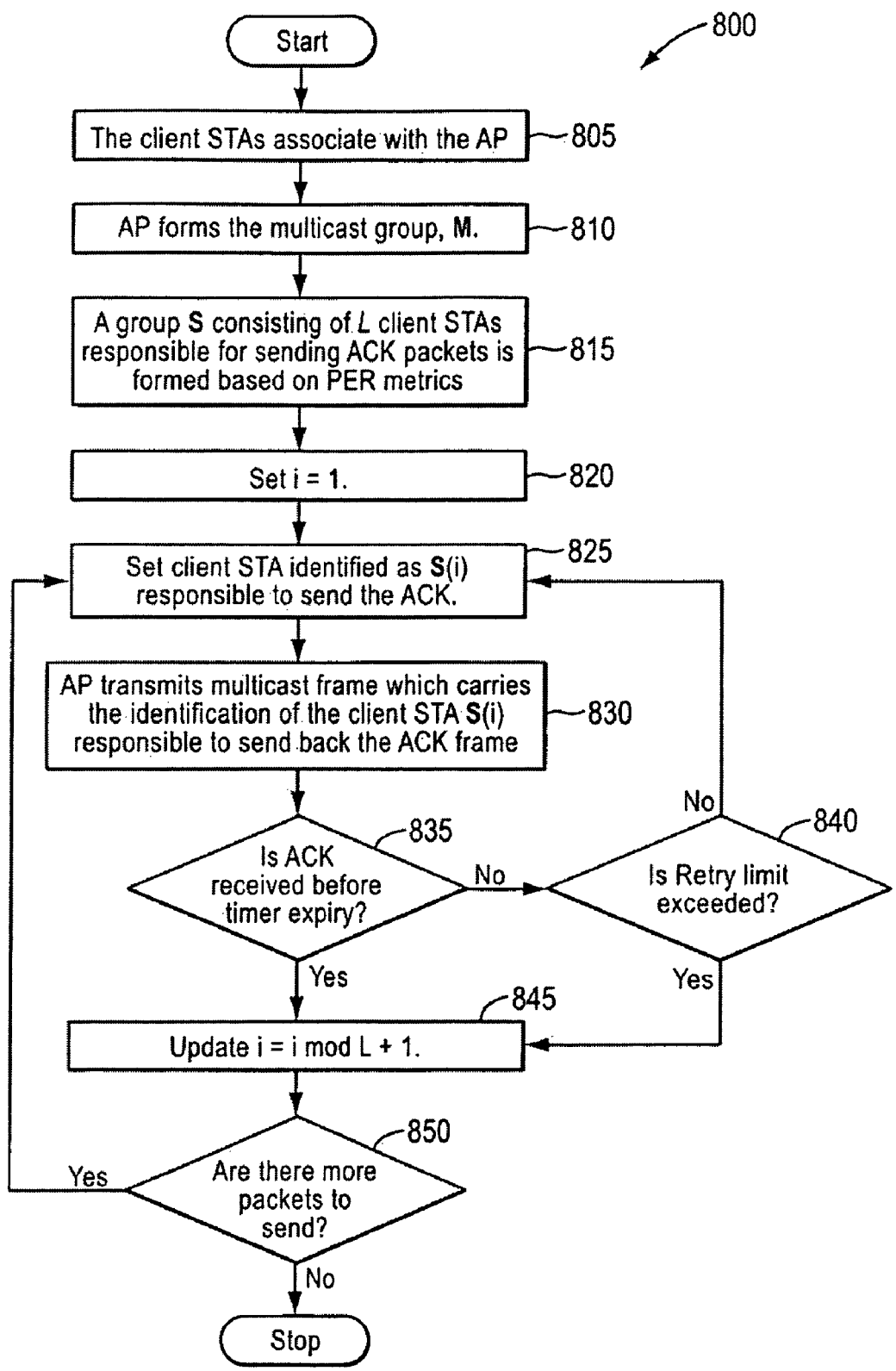
FIG. 8 is a flowchart illustrating an AP multicast/broadcast reliability enhancement method, in accordance with an embodiment of the present invention.

FIG. 8 is a flowchart illustrating an AP method 800 of shifting ACK leaders, in accordance with an embodiment of the present invention. Method 800 begins with the AP association engine 610 of each client STA 500 in step 805 associating with the AP 300. The multicast group formation engine 410 of the AP 300 in step 810 forms the multicast group M of N STAs. The ACK leader selection engine 415 of the AP 300 in step 815 designates a group S of L STAs (where $1 \leq L \leq N$) as possible ACK leaders. In one embodiment, STAs belonging to M report their packet error rates (PER) or signal strength (e.g. RSSI) to the AP 300. The ACK leader selection engine 415 selects STAs from M to be included in group S based on the PER metrics, signal strength, and/or the like.

The ACK management engine 420 of the AP 300 in step 820 sets a variable i equal to 1. Then, the ACK management engine 420 in step 825 designates the STA 500 identified by S(i) as the current ACK leader. The AP communication engine 405 of the AP 300 in step 830 transmits the groupcast packet with the S(i) STA ID in the header. The ACK management engine 420 in step 835 determines if an ACK is received before the expiration of a predetermined time period. If not, then the ACK management engine 420 in step 840 determines if the maximum number of retries has occurred. If not, then the method 800 returns to step 825 to select a new STA as the current ACK leader. If the ACK is received or the retry limit has been reached, then the ACK management engine 420 in step 845 updates i to effect ACK leader shifting in a round robin manner about the L STAs of group S, e.g., by modifying i according to the equation i=(i mod L)+1. It will be appreciated that this example equations will count to L and then return to i=1. The AP communication engine 405 in step 850 determines if there are any more packets to send. If so, then method 800 returns to step 825 to select a new ACK leader. If not, then method 800 ends.

Figure 9:
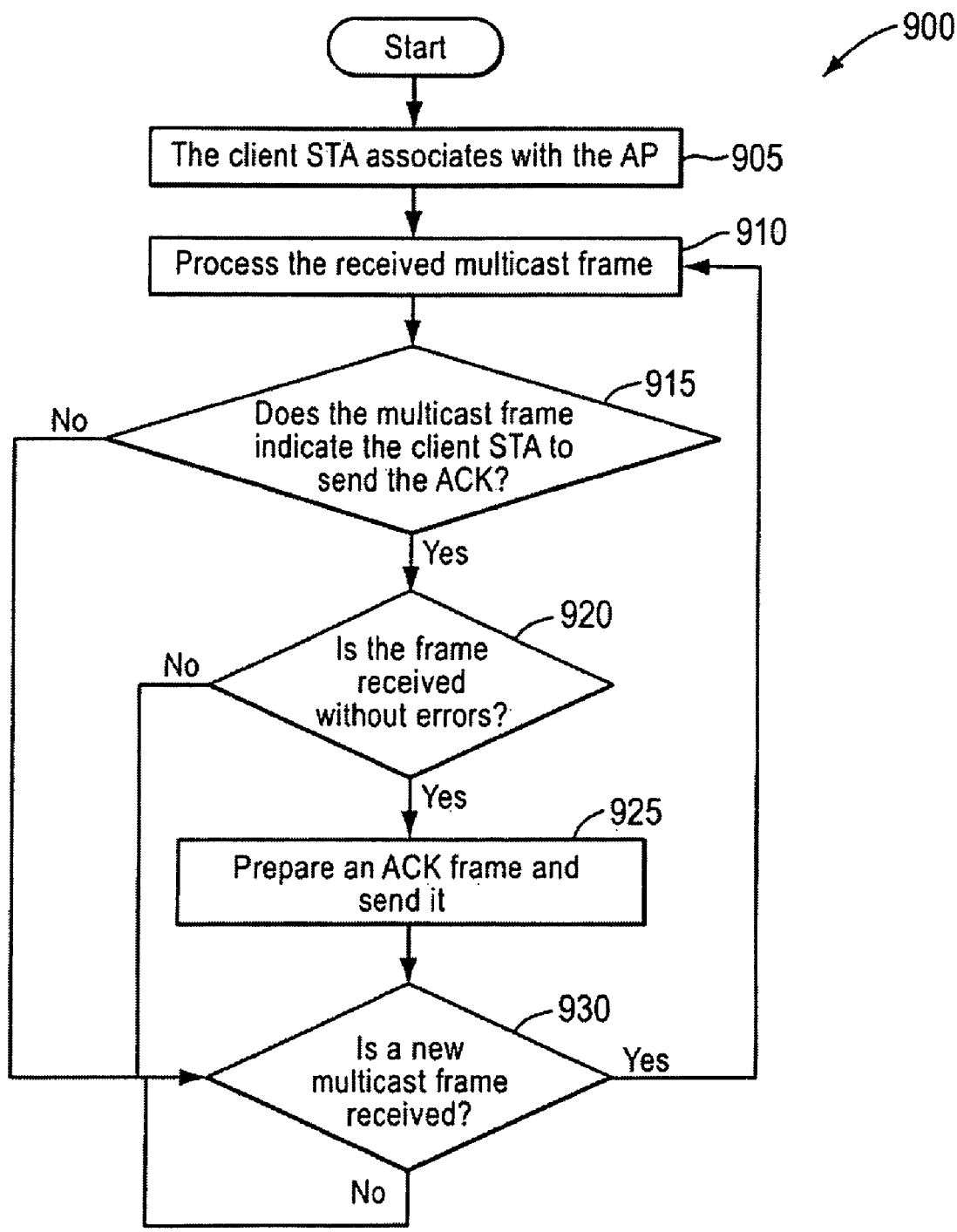
FIG. 9 is a flowchart illustrating a STA multicast/broadcast reliability enhancement method, in accordance with an embodiment of the present invention.

FIG. 9 is a flowchart illustrating a STA method 900 of shifting ACK leaders, in accordance with an embodiment of the present invention. Method 900 begins with the AP association engine 610 of the STA 500 in step 905 associating with the AP 300. In one embodiment, step 905 includes receiving a STA ID. The STA communication engine 605 in step 910 receives a groupcast packet. The ACK generation engine 615 of the STA 500 in step 915 determines whether the groupcast packet indicates that the STA 500 is responsible to respond to the received packet with an ACK, e.g., by recognizing its STA ID. If so, then the ACK generation engine 615 in step 920 requests the packet error checking engine 620 to conduct error checking of the groupcast packet. If no errors are found, the ACK generation engine 615 in step 925 prepares and transmits an ACK to the AP 300. If the received packet in step 915 does not identify the STA, if the frame in step 920 is found to have an error or if the frame in step 920 is not received, then the STA communication engine 605 in step 930 waits to receive another packet, which may be the next packet, a second instance of the previous packet, a second attempt of the previous packet. Upon receipt of a new groupcast packet, method 900 returns to step 910.

Figure 10:
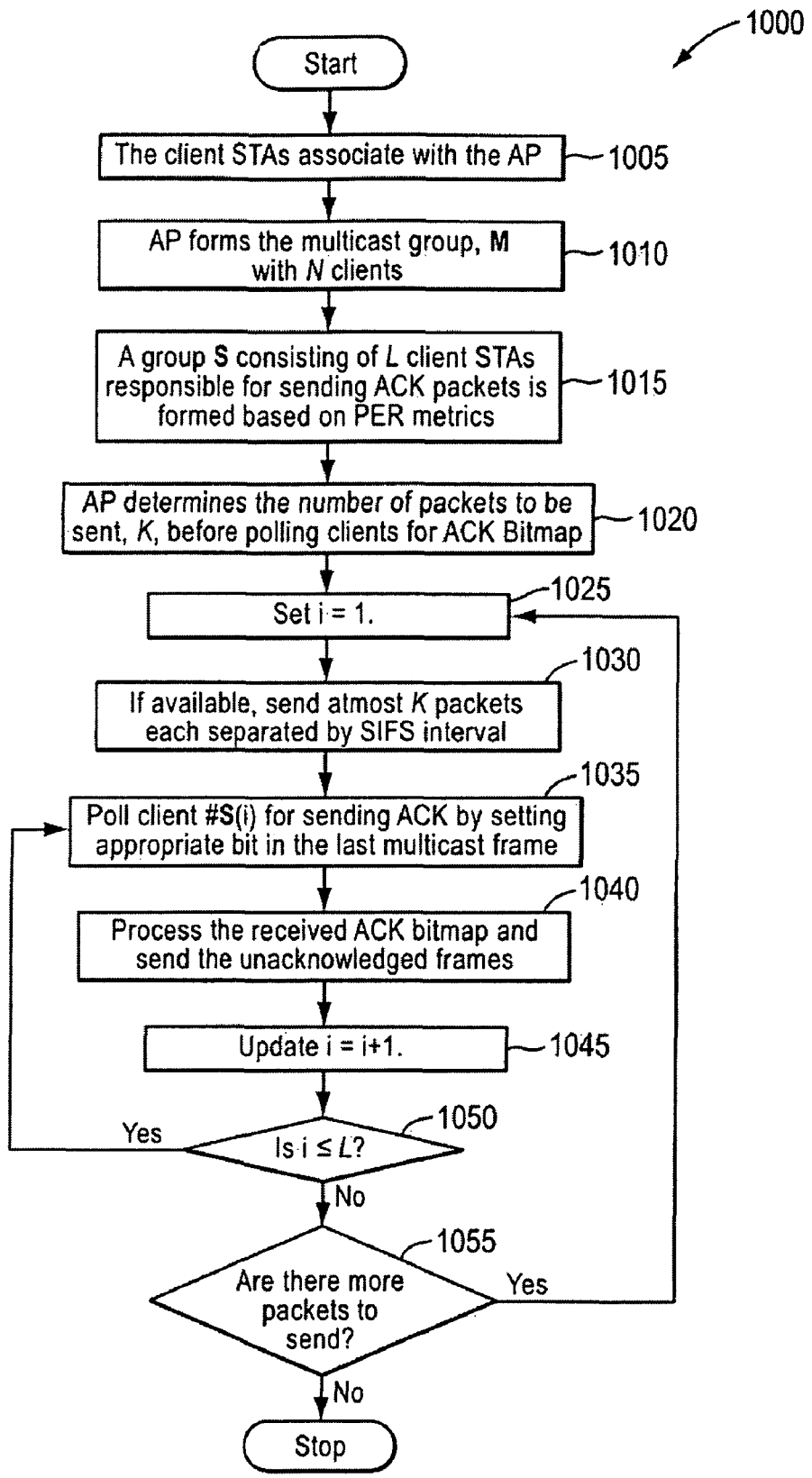
FIG. 10 is a flowchart illustrating an AP multicast/broadcast reliability enhancement method, in accordance with another embodiment of the present invention.

FIG. 10 is a flowchart illustrating a method 1000 of shifting block-ACK leaders by the AP 300, in accordance with another embodiment of the present invention. Method 1000 begins with the AP association engine 610 of each STA 500 in step 1005 associating with the AP 300. The multicast formation engine 410 of the AP 300 in step 1010 forms a multicast group M of N STAs. The ACK leader selection engine 415 of the AP 300 in step 1015 selects a group S of L STAs (where $1 \leq L \leq N$) as possible block-ACK leaders. In one embodiment, the ACK leader selection engine 415 uses PER, signal strength, and or other metrics to determine the group S. The ACK management engine 420 of the AP 300 in step 1020 determines the number of packets K to be sent before polling the block-ACK leaders for a block-ACK, e.g., an ACK bitmap.

The ACK management engine 420 in step 1025 sets i equal to 1. The AP communication engine 405 of the AP 300 in step 1030 sends K packets to the STAs 500 (each separated by an conventional SIFS interval). The ACK management engine 420 in step 1035 polls STA identified by S(i) for its block-ACK response, e.g., for information about the receipt of all groupcast packets since the last ACK bitmap. In one embodiment, the ACK management engine 420 includes the STA ID and/or an ACK-active bit in the last packet to initiate the block-ACK. The ACK management engine 420 in step 1040 processes the received block-ACK and in one embodiment sends the unacknowledged packets. The ACK management engine 420 in step 1045 updates i by the equation i=i+1. The ACK management engine 420 in step 1050 determines if i is less than or equal to L. If so, then method 1000 returns to step 1035 to poll the next STA. If not, then the AP communication engine 405 in step 1055 determines if there are any more packets to transmit. If so, then method 1000 returns to step 1025. Otherwise, method 1000 ends. It will be appreciated that a block-ACK leader model may alternatively be implemented.

Figure 11:
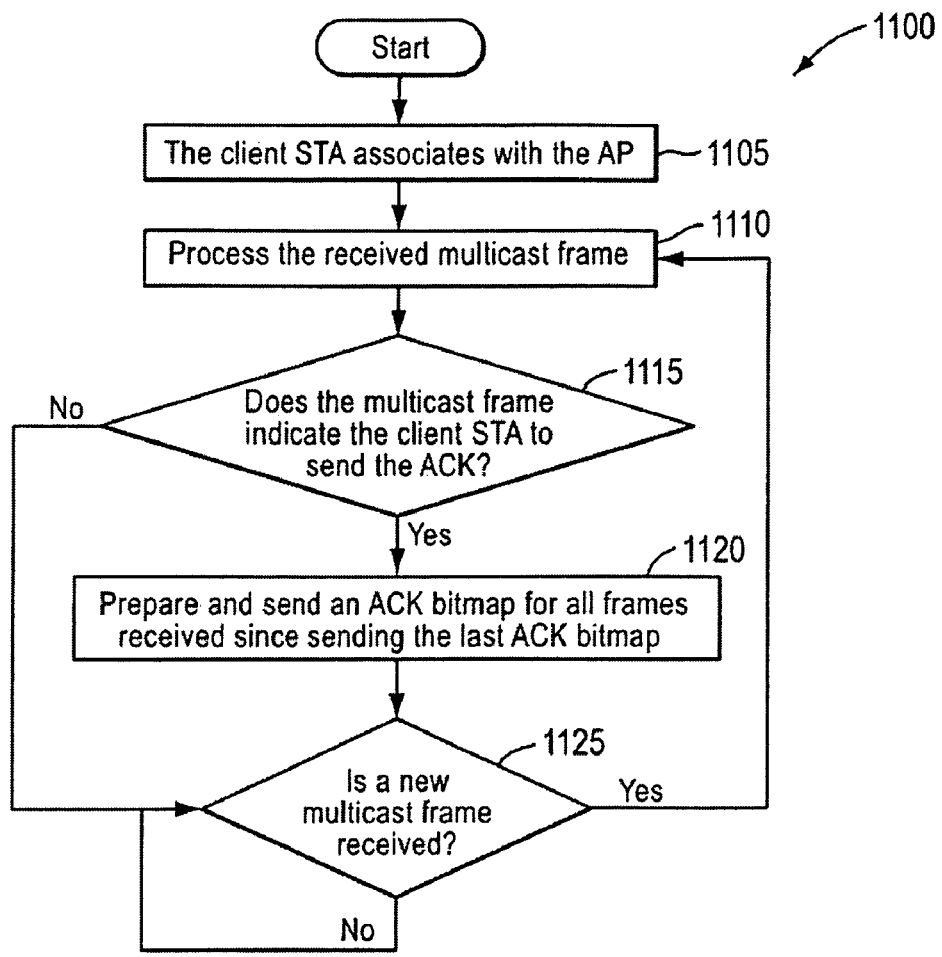
FIG. 11 is a flowchart illustrating a STA multicast/broadcast reliability enhancement method, in accordance with another embodiment of the present invention.

FIG. 11 is a flowchart illustrating a method 1100 for shifting block-ACK leaders, in accordance with another embodiment of the present invention. Method 1100 begins with the AP association engine 610 in step 105 associating with the AP 300. The STA communication engine 605 in step 1110 receives a first groupcast packet. The ACK generation engine 615 in step 1115 determines whether the groupcast packet identifies it to send a block-ACK in response. If not, then method 1100 proceeds to step 1125. If so, then the ACK generation engine 615 (in cooperation with the packet error checking engine 620) in step 1120 prepares a block-ACK response, and then proceeds to step 1125. In step 1125, the STA communication engine 605 waits a new packet, e.g., a new block of packets, replacement packets, missing packets, etc. Upon receipt of a new packet, method 1100 returns to step 1110.

Figure 12:
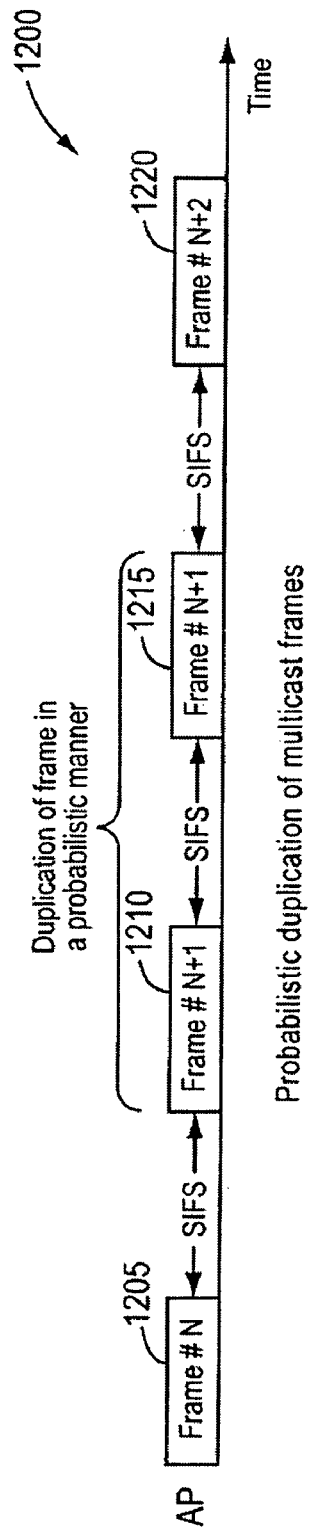
FIG. 12 is a packet diagram illustrating probabilistic replication of packets by the AP of multicast frames, in accordance with another embodiment of the present invention.

FIG. 12 is a packet diagram 1200 illustrating probabilistic replication of groupcast packets by an AP 300, in accordance with another embodiment of the present invention. As shown, the AP sends a first packet 1205 (Frame #N), a second packet 1210 (Frame #N+1), a third packet 1215 (Frame #N+1) which is a duplicate of the third packet 1210, and a fourth packet 1220 (Frame #N+2), each separated by a conventional SIFS interval. In one embodiment, the packet replication engine 425 of the AP 300 replicates packets based on a probabilistic mechanism, wherein the probabilistic mechanism is based on packet error rates (PER), signal strength, and/or the like. The PER, signal strength and/or other metrics may be forwarded to the AP 300 from the STAs 500. The packet replication engine 425 may compute the packet repetition probability P using the PER metrics, signal strength metrics, etc. For example, if one of two STAs 500 on a network has a PER of 10% and the second of the two STAs has a PER of 8%, then repetition may be determined as 1.5×Max(PER), or 15%. The AP 300 uses the probability parameter. to randomly duplicate some of the groupcast packets. This can be implemented by generating a uniformly distributed random variable v within the interval [0,1]. If v<P, e.g., if v<0.15, the groupcast packet may be transmitted again, possibly for a maximum of two times. Otherwise, it is not retransmitted.

In one embodiment, the packet replication engine 425 may use frame information with or without the probabilistic mechanism to determine whether to repeat frames. For example, the packet replication engine 425 may repeat I-frames, but not P-frames or B-frames. Alternatively, for example, the packet replication engine 425 may repeat I-frames in a probabilistic manner as described above. It will be appreciated that packet repetition may also apply to unicast streams. It will also be appreciated that no ACK may be needed.

Figure 13:
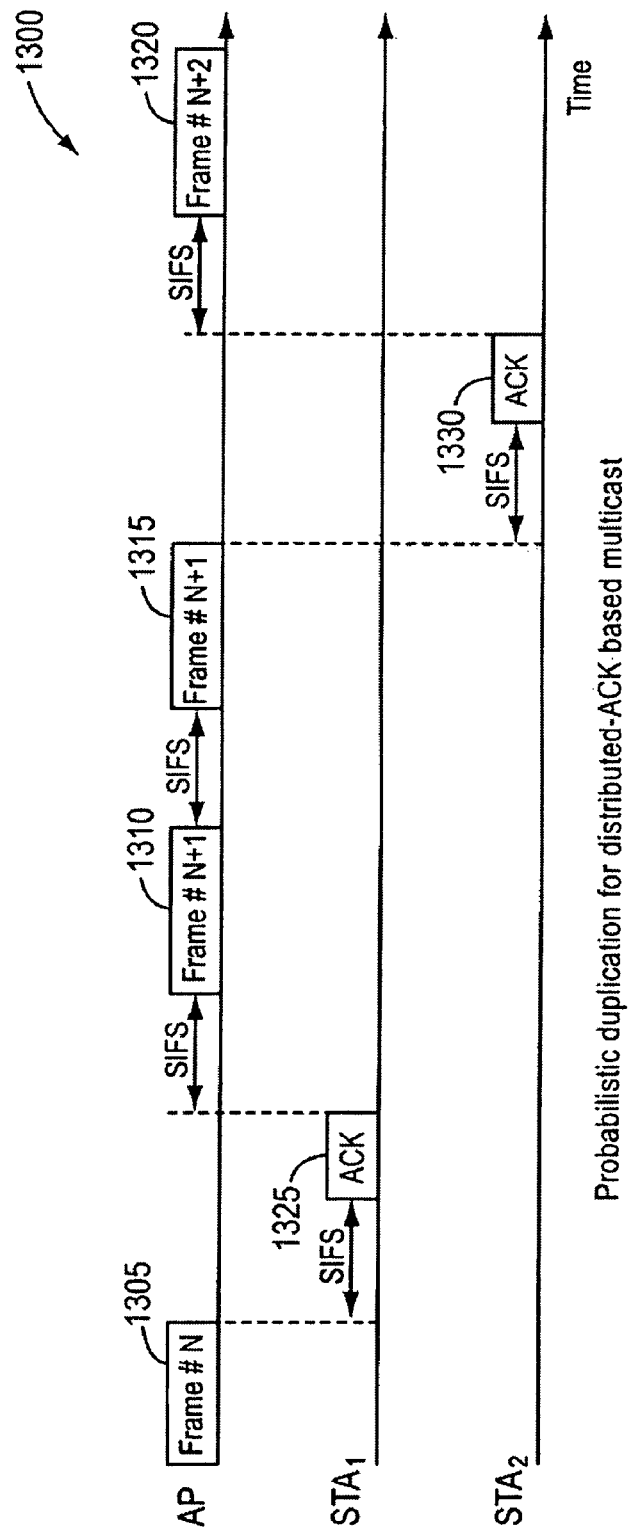
FIG. 13 is a packet diagram illustrating probabilistic replication of packets by the AP and ACKs by the STAs in a distributed-ACK multicast network, in accordance with an embodiment of the present invention.

FIG. 13 is a packet diagram 1300 illustrating probabilistic replication of packets by the AP in a distributed-ACK groupcast network, in accordance with an embodiment of the present invention. As shown, after determining that a packet will be not retransmitted, the AP 300 transmits a first frame 1305 (Frame #N) containing the STA ID of STA1 and an ACK-active bit. Accordingly, STA1 issues an ACK after a conventional SIFS interval, the ACK indicating that the first frame 1305 was error free. After determining that a repeat frame will be transmitted, the AP 300 transmits a second frame 1310 (Frame #N+1) containing an ACK-inactive bit and possibly the STA ID of the current ACK leader, and a third frame 1315 (Frame #N+1) which is a repeat of the second frame 1310 however containing the STA ID of STA2 and an ACK-active bit. Thus, in response to the second frame 1310, no STA responds with an ACK. However, after the third frame 1315, STA2 issues an ACK after an appropriate SIFS interval, the ACK indicating that at least one of the second frame 1310 or the third frame 1315 was error free. Then, after determining whether a repeat frame should be transmitted, the AP 300 then transmits a fourth frame 1320 (Frame #N+2).

Embodiments of the present invention may find applications in the HDTV market, e.g., for wireless home/office networks. Embodiments of the invention make groupcast delivery of multimedia content over wireless medium more reliable without violating the legacy MAC protocol of IEEE WLAN standards.

The foregoing description of the preferred embodiments of the present invention is by way of example only, and other variations and modifications of the above-described embodiments and methods are possible in light of the foregoing teaching. Although the network sites are being described as separate and distinct sites, one skilled in the art will recognize that these sites may be a part of an integral site, may each include portions of multiple sites, or may include combinations of single and multiple sites. The various embodiments set forth herein may be implemented utilizing hardware, software, or any desired combination thereof. For that matter, any type of logic may be utilized which is capable of implementing the various functionality set forth herein. Components may be implemented using a programmed general purpose digital computer, using application specific integrated circuits, or using a network of interconnected conventional components and circuits. Connections may be wired, wireless, modem, etc. The embodiments described herein are not intended to be exhaustive or limiting. The present invention is limited only by the following claims.

The invention claimed is:

1. A Wireless LAN system comprising:
an access point; and
a plurality of wireless stations which communicate with the access point via a wireless network,
wherein the access point includes:
a communication engine for transmitting at least one groupcast packet to the wireless stations on the wireless network;
an ACK leader selection engine for identifying at least one of the wireless stations as a current ACK leader responsible for generating any ACK in response to the at least one groupcast packet, and for shifting the current ACK leader among a group of the wireless stations; and
an ACK management engine for managing any ACK received from the current ACK leader.

2. The system of claim 1, wherein the ACK leader selection engine identifies possible ACK leaders from the wireless stations based on packet error rate metrics.

3. The system of claim 2, wherein the ACK leader selection engine identifies possible ACK leaders from the wireless station based on signal strength metrics.

4. The system of claim 1, wherein the ACK management engine instructs the communication engine to retransmit the at least one groupcast packet if no ACK is received from the ACK leader.

5. The system of claim 1, wherein the communication engine includes an identifier in the at least one groupcast packet that identifies the current ACK leader.

6. The system of claim 1, wherein the communication engine includes an identifier having an ACK active/ACK-inactive bit that identifies whether the current ACK leader is requested to respond with an ACK.

7. The system of claim 1, wherein the at least one groupcast packet includes a plurality of groupcast packets, and the ACK includes a block-ACK.

8. The system of claim 7, wherein the ACK management engine instructs the communication engine to retransmit at least the groupcast packets identified in the block-ACK as having an error.

9. The system of claim 1, wherein the group of wireless stations includes a subset of the wireless stations on the wireless network.

10. A method in a Wireless LAN system comprising an access point, and a plurality of wireless stations which communicate with the access point via a wireless network, comprising:
identifying, at the access point, at least one wireless station of a first group of wireless stations on the wireless network as a current ACK leader;
transmitting at least one groupcast packet to a second group of wireless stations on the wireless network;
managing any ACK received from the current ACK leader; and
identifying a new ACK leader within the first group of the wireless stations.

11. The method of claim 10, further comprising identifying possible ACK leaders based on packet error rate metrics.

12. The method of claim 11, further comprising identifying possible ACK leaders based on signal strength metrics.

13. The method of claim 10, further comprising retransmitting the at least one groupcast packet if no ACK is received from the ACK leader.

14. The method of claim 10, further comprising including an identifier in the at least one groupcast packet that identifies the current ACK leader.

15. The method of claim 14, wherein the identifier includes an ACK-active/ACK inactive bit that identifies whether the current ACK leader is requested to respond with an ACK.

16. The method of claim 10, wherein the at least one groupcast packet includes a plurality of groupcast packets, and the ACK includes a block-ACK.

17. The method of claim 16, further comprising retransmitting at least the groupcast packets identified in the block-ACK as having an error.

18. The method of claim 10, wherein the first group of wireless stations includes a subset of the second group of wireless stations.

19. The method of claim 1, wherein the first group of wireless stations is the same as the second group of wireless stations.

20. A method comprising:
receiving at least one groupcast packet from an access point at a plurality of wireless station communicating with the access point via a wireless network;
determining whether the at least one groupcast packet identifies the wireless station as a current ACK leader from a group of wireless stations; and
generating, by the wireless station, any ACK to the access point in response to the at least one groupcast packet received, if the at least one groupcast packet identifies the wireless station as the current ACK leader.

* * * * *